US011186009B2

(12) United States Patent
Bjornstad et al.

(10) Patent No.: US 11,186,009 B2
(45) Date of Patent: Nov. 30, 2021

(54) MULTI-FUNCTION JOYSTICK FOR CONCRETE MIXER VEHICLE

(71) Applicant: Oshkosh Corporation, Oshkosh, WI (US)

(72) Inventors: Neil Bjornstad, Oshkosh, WI (US); Jeremy Andringa, Oshkosh, WI (US); Eric Wall, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 92 days.

(21) Appl. No.: 16/813,163

(22) Filed: Mar. 9, 2020

(65) Prior Publication Data

US 2020/0290236 A1 Sep. 17, 2020

Related U.S. Application Data

(60) Provisional application No. 62/817,360, filed on Mar. 12, 2019.

(51) Int. Cl.
*B28C 5/42* (2006.01)

(52) U.S. Cl.
CPC ............ *B28C 5/422* (2013.01); *B28C 5/4206* (2013.01); *B28C 5/4213* (2013.01); *B28C 5/4227* (2013.01); *B28C 5/4237* (2013.01); *B28C 5/4248* (2013.01); *B28C 5/4272* (2013.01)

(58) Field of Classification Search
CPC ..... B28C 5/422; B28C 5/4237; B28C 5/4213; B28C 5/4248; B28C 5/4272; B28C 5/4206; B28C 5/4227; B60P 3/16
USPC ...................................................... 366/60–61
See application file for complete search history.

(56) References Cited

U.S. PATENT DOCUMENTS

| | | | | |
|---|---|---|---|---|
| 6,149,290 | A * | 11/2000 | Quigley ................ | B28C 5/4248 296/64 |
| 7,188,991 | B1 * | 3/2007 | Weiler .................. | B28C 5/4206 180/324 |
| 2003/0163228 | A1 | 8/2003 | Pillar et al. | |
| 2003/0163229 | A1 | 8/2003 | Pillar et al. | |
| 2003/0163230 | A1 | 8/2003 | Pillar et al. | |
| 2003/0171854 | A1 | 9/2003 | Pillar et al. | |
| 2004/0069865 | A1 | 4/2004 | Rowe et al. | |
| 2004/0199302 | A1 | 10/2004 | Pillar et al. | |
| 2005/0004733 | A1 * | 1/2005 | Pillar ...................... | B28C 5/468 701/48 |
| 2007/0061054 | A1 | 3/2007 | Rowe et al. | |
| 2007/0185625 | A1 | 8/2007 | Pillar et al. | |
| 2008/0205188 | A1 | 8/2008 | Lindblom et al. | |

(Continued)

*Primary Examiner* — Charles Cooley
(74) *Attorney, Agent, or Firm* — Foley & Lardner LLP

(57) ABSTRACT

A controller for a concrete mixer vehicle includes a base, an elongated shaft extending from the base, and a control portion positioned at free end of the elongated shaft. The control portion has a grip portion and a button interface providing at least one of a plurality of controls. The plurality of controls facilitate selectively operating (i) a hopper actuator to reposition a charge hopper between a first position and a second position, (ii) a first chute actuator to pivot a chute about a lateral axis to raise and lower a distal end of the chute, (iii) a second chute actuator to pivot the chute about a vertical axis to move the distal end left and right, (iv) a drum driver to control at least one of a speed or a rotational direction of a mixing drum, and (v) a transmission of the concrete mixer vehicle in one of a plurality of modes.

14 Claims, 6 Drawing Sheets

(56) References Cited

U.S. PATENT DOCUMENTS

| | | | |
|---|---|---|---|
| 2008/0221754 A1 | 9/2008 | Rowe et al. | |
| 2009/0154287 A1 | 6/2009 | Lindblom et al. | |
| 2009/0238026 A1* | 9/2009 | Johnson | B28C 5/4244 366/43 |
| 2011/0058446 A1 | 3/2011 | Khouri | |
| 2013/0107656 A1 | 5/2013 | Datema et al. | |
| 2015/0151651 A1 | 6/2015 | Stingle et al. | |
| 2015/0246331 A1 | 9/2015 | Broker et al. | |
| 2016/0304051 A1 | 10/2016 | Archer et al. | |
| 2017/0080600 A1* | 3/2017 | Dickerman | B60P 3/16 |
| 2017/0361491 A1* | 12/2017 | Datema | G06Q 10/04 |
| 2017/0361492 A1 | 12/2017 | Datema et al. | |
| 2018/0250847 A1 | 9/2018 | Wurtz et al. | |
| 2019/0091890 A1 | 3/2019 | Rocholl et al. | |
| 2019/0106083 A1 | 4/2019 | Archer et al. | |
| 2019/0217698 A1 | 7/2019 | Broker et al. | |
| 2019/0276102 A1 | 9/2019 | Zuleger et al. | |
| 2019/0344475 A1 | 11/2019 | Datema et al. | |
| 2020/0078986 A1 | 3/2020 | Clifton et al. | |
| 2020/0108364 A1* | 4/2020 | Glass | B01F 15/00558 |
| 2020/0230841 A1 | 7/2020 | Datema et al. | |
| 2020/0230842 A1 | 7/2020 | Datema et al. | |
| 2020/0290236 A1* | 9/2020 | Bjornstad | B28C 5/4248 |
| 2020/0290237 A1* | 9/2020 | Steffens | B28C 5/468 |
| 2020/0290238 A1* | 9/2020 | Andringa | B28C 5/4265 |
| 2020/0316816 A1* | 10/2020 | Messina | B28C 5/4265 |

* cited by examiner

MULTI-FUNCTION JOYSTICK FOR CONCRETE MIXER VEHICLE

CROSS-REFERENCE TO RELATED PATENT APPLICATION

This application claims the benefit of U.S. Provisional Patent Application No. 62/817,360, filed Mar. 12, 2019, which is incorporated herein by reference in its entirety.

BACKGROUND

Concrete mixer vehicles are configured to receive, mix, and transport wet concrete or a combination of ingredients that when mixed form wet concrete to a job site. Concrete mixer vehicles include a rotatable mixing drum that receives concrete poured from vehicles or from stationary facilities, such as concrete mixing plants, and mixes the concrete disposed therein. Concrete mixer vehicles may be front discharge concrete mixer vehicles or rear discharge concrete mixer vehicles, which dispense concrete from the front or rear thereof, respectively. Rear discharge concrete mixer vehicles generally feature a drum with an outlet positioned at an aft end and a cab enclosure positioned at a fore end of the concrete mixer truck. Front discharge concrete mixer vehicles include a drum with an outlet supported above the cab enclosure of the concrete mixer vehicle to discharge concrete through a chute extending forward the concrete mixer vehicle. Because front discharge concrete mixer vehicles discharge concrete at the fore end, they can be used to supply concrete to locations having limited access. Concrete mixer vehicles are typically driven by an onboard internal combustion engine.

SUMMARY

One embodiment relates to a concrete mixer vehicle. The concrete mixer vehicle includes a chassis, an engine coupled to the chassis, a front axle coupled to the chassis, a rear axle coupled to the chassis, a transmission coupled to the engine and at least one of the front axle or the rear axle, a cab coupled to the chassis, a drum assembly coupled to the chassis, a plurality of actuators, and a single joystick. The transmission is selectively operable in a plurality of modes including a drive mode, a neutral mode, and a reverse mode. The cab defines an interior compartment. The drum assembly includes a mixing drum defining an aperture and an internal volume, a charge hopper positioned proximate the aperture, and a chute positioned proximate the aperture, beneath the charge hopper. The plurality of actuators includes a hopper actuator, a first chute actuator, a second chute actuator, and a drum driver. The hopper actuator is positioned to move the charge hopper between a first position and a second position. The first position facilitates loading materials into the internal volume of the mixing drum via the charge hopper through the aperture. The second position facilitates discharging the materials from the internal volume, through the aperture, and to the chute. The first chute actuator is positioned to pivot the chute about a lateral axis. The second chute actuator is positioned to pivot the chute about a vertical axis. The drum driver is positioned to drive the mixing drum. The single joystick is positioned within the interior compartment of the cab and provides a plurality of controls that facilitate selectively operating the plurality of actuators and the transmission. Specifically, the plurality of controls facilitate selectively operating (i) the hopper actuator to reposition the charge hopper between the first position and the second position, (ii) the first chute actuator to pivot the chute about the lateral axis to raise and lower a distal end of the chute, (iii) the second chute actuator to pivot the chute about the vertical axis to move the distal end left and right, (iv) the drum driver to control at least one of a speed or a rotational direction of the mixing drum, and (v) the transmission in one of the plurality of modes.

Another embodiment relates to a controller for a concrete mixer vehicle. The controller includes a base, an elongated shaft extending from the base, and a control portion positioned at free end of the elongated shaft. The control portion has a grip portion for a hand of an operator and a button interface providing at least one of a plurality of controls. The plurality of controls facilitate selectively operating (i) a hopper actuator to reposition a charge hopper of the concrete mixer vehicle between a first position and a second position, (ii) a first chute actuator to pivot a chute of the concrete mixer vehicle about a lateral axis to raise and lower a distal end of the chute, (iii) a second chute actuator to pivot the chute about a vertical axis to move the distal end left and right, (iv) a drum driver to control at least one of a speed or a rotational direction of a mixing drum of the concrete mixer vehicle, and (v) a transmission of the concrete mixer vehicle in one of a plurality of modes.

Still another embodiment relates to a concrete mixer vehicle. The concrete mixer vehicle includes a chassis, an engine coupled to the chassis, a front axle coupled to the chassis, a rear axle coupled to the chassis, a transmission coupled to the engine and at least one of the front axle or the rear axle, a cab coupled to the chassis, a drum assembly coupled to the chassis, a drum actuator, a first chute actuator, a second chute actuator, a third chute actuator, a drum driver, and a joystick. The cab defines an interior compartment. The drum assembly includes a mixing drum defining an aperture and an internal volume, a charge hopper positioned proximate the aperture, a chute positioned proximate the aperture, beneath the charge hopper, and a chute extension pivotally coupled to a distal end of the chute. The hopper actuator is positioned to move the charge hopper between a first position and a second position. The first chute actuator is positioned to pivot the chute about a lateral axis. The second chute actuator is positioned to pivot the chute about a vertical axis. The third chute actuator is positioned to pivot the chute extension relative to the chute between a first configuration and a second configuration. The drum driver is positioned to drive the mixing drum. The joystick is positioned within the interior compartment of the cab. The joystick includes a base, an elongated shaft extending from the base, and a control portion positioned at free end of the elongated shaft. The control portion has a grip portion for a hand of an operator and a button interface. The button interface includes (i) a charge hopper button that facilitates selectively operating the hopper actuator, (ii) an extension chute button that facilitates selectively operating the third chute actuator, (iii) a stop button that facilitates stopping operation of the drum driver to stop rotation of the mixing drum, (iv) a first dial selectively repositionable in a first direction and an opposing second direction from a neutral position to control at least one of a speed or a rotational direction of the mixing drum, and (v) a second dial repositionable in a first direction and an opposing second direction from a neutral position to selectively reconfigure the transmission between a drive mode, a neutral mode, and a reverse mode. The base is selectively repositionable within a x-y plane in response to movement of the grip portion by the operator. Movement of the base in one of a x-direction or a y-direction selectively operates the first chute actuator.

Movement of the base in the other of the x-direction or the y-direction selectively operates the second chute actuator.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a single controller (e.g., a multi-function joystick) of a concrete mixer vehicle provides an operator with the ability to control multiple functions of multiple components (e.g., a mixing drum function, a chute function, a charge hopper function, a vehicle function, etc.) of the concrete mixer vehicle using the single controller. By way of example, the single controller may be configured to facilitate controlling (i) a chute to (a) swing left-to-right (e.g., about a vertical axis), (b) elevate and lower (e.g., about a horizontal axis), and/or (iii) fold and unfold; (ii) a rotational speed, a rotation direction (e.g., clockwise or counter-clockwise), and/or movement of a mixing drum; (iii) a position of a charge hopper; and/or (iv) a drive system to shift a transmission between neutral, forward, and reverse.

According to an exemplary embodiment, a water tracking system of the concrete mixer vehicle is configured to monitor and provide information related to water used from a water tank of the concrete mixer vehicle for use in (i) the mixing drum to facilitate controlling the properties of a mixture within the mixing drum, (ii) cleaning components of the concrete mixer vehicle, and/or (iii) other non-mixing drum related water usage applications. The water tracking system may be operably connected to an outlet of the water tank and controlled via a control panel of the concrete mixer truck. An operator may press, rotate, or otherwise engage features of the control panel to control and/or monitor water usage of the water in the water tank.

Overall Vehicle

Figure 1:
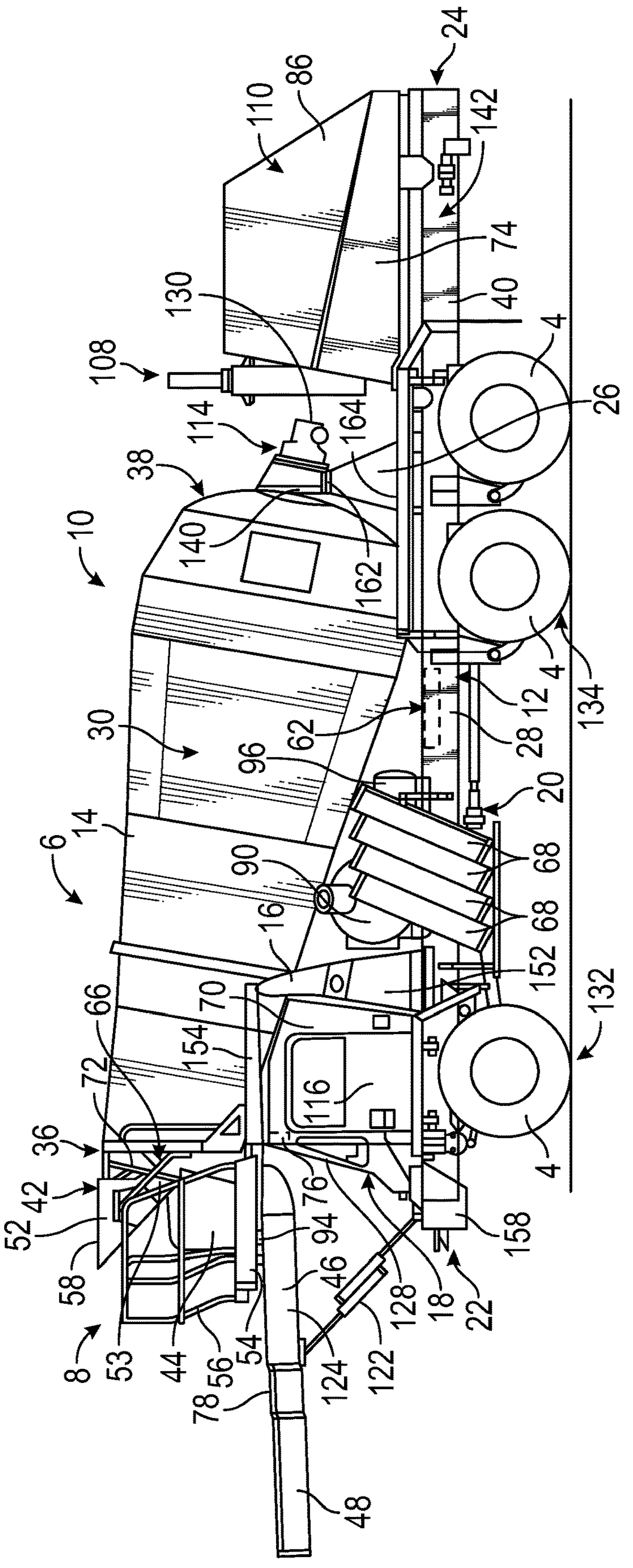
FIG. 1 is a side view of a concrete mixer truck, according to an exemplary embodiment.
Figure 2:
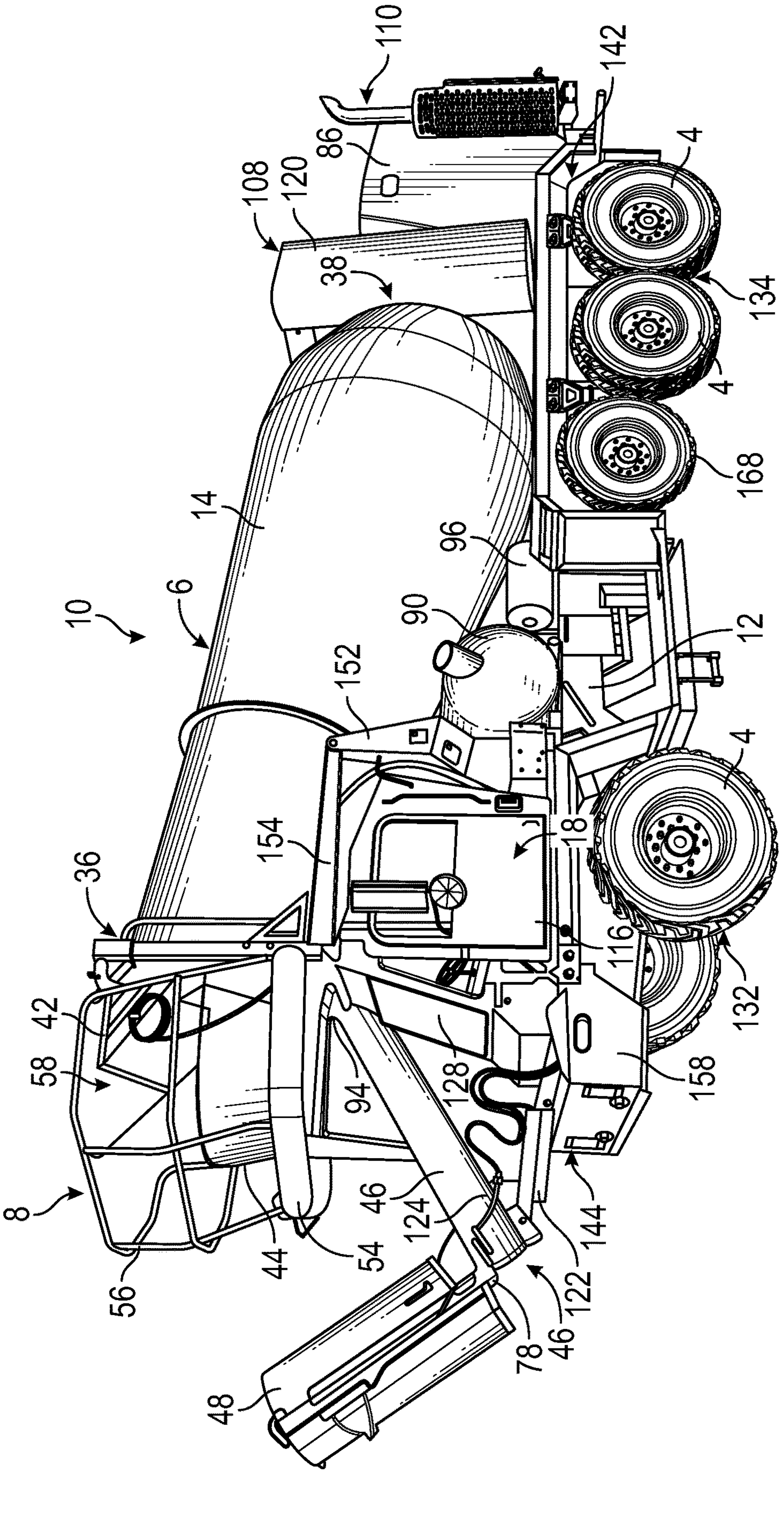
FIG. 2 is a front perspective view of the concrete mixer truck of FIG. 1, according to an exemplary embodiment.
Figure 3:
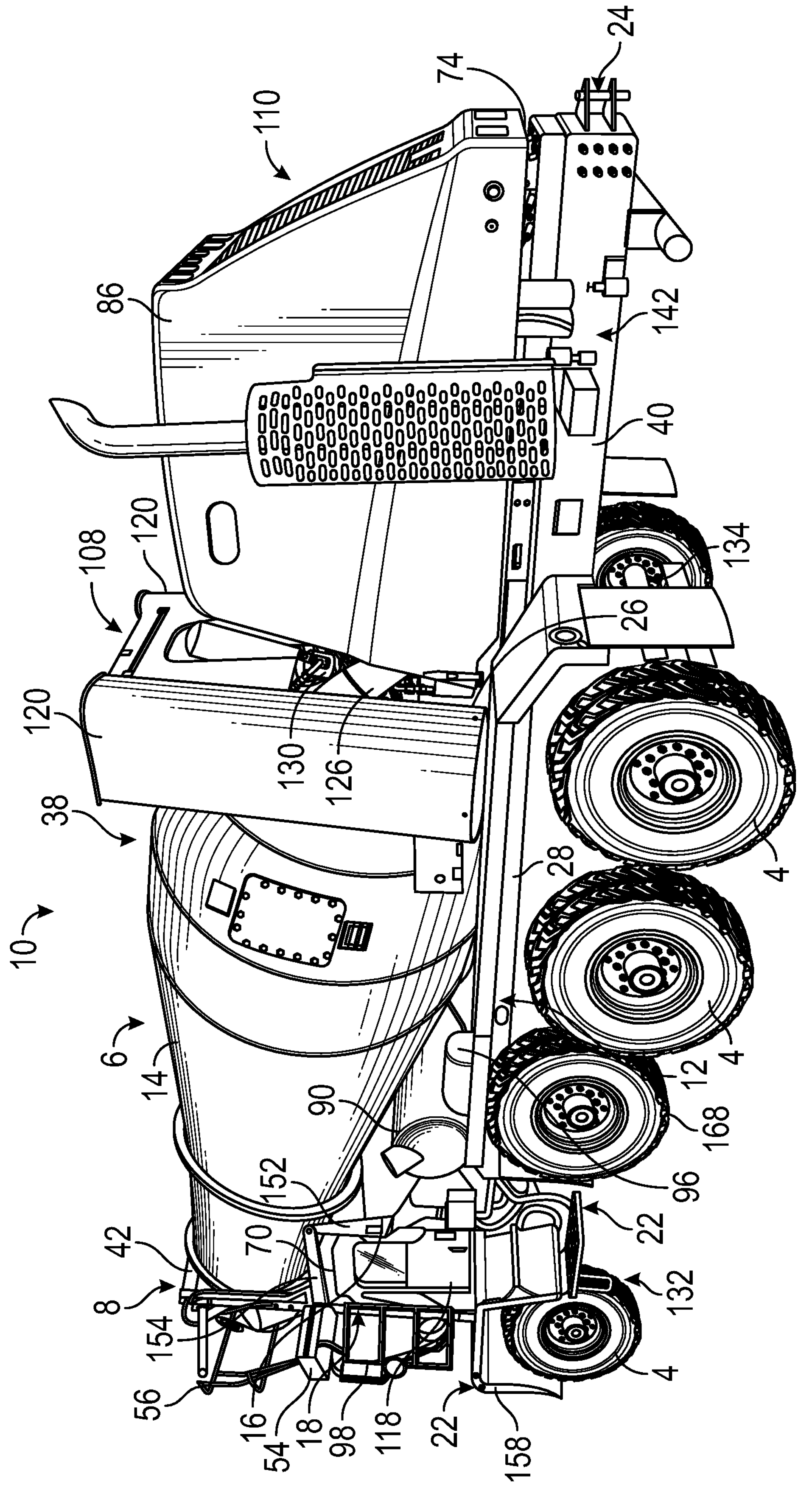
FIG. 3 is a rear perspective view of the concrete mixer truck of FIG. 1, according to an exemplary embodiment.

According to the exemplary embodiment shown in FIGS. 1-3, a vehicle, shown as concrete mixer truck 10, is configured to transport concrete from a loading location (e.g., a batching plant, etc.) to a point of use (e.g., a worksite, a construction site, etc.). In some embodiments, as shown in FIGS. 1-3, the concrete mixer truck 10 is a front discharge concrete mixer vehicle. In other embodiments, the concrete mixer truck 10 is a rear discharge concrete mixer vehicle. The concrete mixer truck 10 includes a chassis 12, a drum assembly 6, a hopper assembly 8, a drive system 20, a fuel system 108, and an engine module 110. The concrete mixer truck 10 may include various additional engine, transmission, drive, electronic, tractive assembly, braking, steering and/or suspension systems, and hydraulic systems that are configured to support the various components of the concrete mixer truck 10. Generally, the chassis 12 supports a mixing drum 14 of the drum assembly 6, a front pedestal 16, a rear pedestal 26, a cab 18, and the engine module 110. Each of the chassis 12, the drum assembly 6, the hopper assembly 8, the drive system 20, the fuel system 108, and the engine module 110 are configured to facilitate receiving, mixing, transporting, and delivering concrete to a job site via the concrete mixer truck 10.

The chassis 12 includes a frame 28 that extends from a front end 22 to a rear end 24 of the concrete mixer truck 10. Wheels 4 are coupled to the frame 28 and moveably support the frame 28 above a ground surface or road. The wheels 4 may be replaced by other ground engaging motive members, such as tracks. In some embodiments, the chassis 12 includes hydraulic components (e.g., valves, filters, pipes, hoses, etc.) coupled thereto that facilitate operation and control of a hydraulic circuit including a drum drive pump and/or an accessory pump. The frame 28 provides a structural base for supporting the mixing drum 14, the front pedestal 16, the rear pedestal 26, the cab 18, and the engine module 110. In some embodiments, the frame 28 includes a widened front portion that extends over and about the wheels 4 positioned at the front end 22 of the chassis 12 to simultaneously support the cab 18 and serve as a fender for the wheels 4 positioned at the front end 22 of the chassis 12. The frame 28 may include lift eyes or other structures that facilitates lifting along the chassis 12 such that the chassis 12 can be manipulated as a subassembly for assembly and/or maintenance of the concrete mixer truck 10. One or more components may be coupled to the chassis 12 using isolating mounts made of a complaint material, such as rubber. The isolating mounts may be configured to reduce the transfer of vibrations between the components and the chassis 12.

The frame 28 includes a pair of frame rails 40 coupled with intermediate cross members, according to an exemplary embodiment. The frame rails 40 extend in a generally-horizontal and longitudinal direction (e.g., extend within 10 degrees of perpendicular relative to a vertical direction, extend within ten degrees of parallel relative to a ground surface when concrete mixer truck 10 is positioned on flat ground, etc.) between the front end 22 and the rear end 24. The frame rails 40 may be elongated "C-channels" or tubular members, according to various exemplary embodiments. In other embodiments, the frame rails 40 include another type of structural element (e.g., monocoque, a hull, etc.). In still other embodiments, the frame rails 40 include a combination of elongated C-channels, tubular members, a monocoque element, and/or a hull element. A first frame rail 40 may be disposed along a first lateral side 142 and a second frame rail 40 may be disposed along a second lateral side 144, respectively, of the concrete mixer truck 10. By way of example, the first lateral side 142 of the chassis 12 may be the left side of the concrete mixer truck 10 (e.g., when an operator is sitting in the cab 18 and positioned to drive the concrete mixer truck 10, etc.) and the second lateral side 144 of the chassis 12 may be the right side of the concrete mixer truck 10 (e.g., when an operator is sitting in the cab 18 and positioned to drive the concrete mixer truck 10, etc.).

The cab 18 is coupled to the frame rails 40 proximate the front end 22 of the chassis 12. According to various embodiments, the cab 18 (e.g., operator cabin, front cabin, etc.) is configured to house one or more operators during operation of the concrete mixer truck 10 (e.g., when driving, when dispensing concrete, etc.), and may include various components that facilitate operation and occupancy of the concrete mixer truck 10 (e.g., one or more seats, a steering wheel, control panels, screens, joysticks, buttons, accelerator, brake, gear lever, etc.). The cab 18 includes a housing 70 that forms the structure of the cab 18. At least one door 116 is affixed to the housing 70 to allow an operator to enter and exit the cab 18. A windshield 128 is disposed along a front side of the housing 70, near the front end 22, and above a front bumper 158 of the concrete mixer truck 10. The windshield 128 is configured to provide visibility to the operator while driving the concrete mixer truck 10, operating a main chute 46, and completing other tasks. The front bumper 158 may be affixed to a bottom portion of the housing 70. In some embodiments, the front bumper 158 is affixed to the frame 28 at the front end 22 of the concrete mixer truck 10.

A control assembly 76 is disposed within the cab 18 and is configured to control one or more components of the concrete mixer truck 10. The control assembly 76 may include controls, buttons, joysticks, and other features that control the movement and orientation of the concrete mixer truck 10, the hopper assembly 8, the main chute 46, a charge hopper 42, a discharge hopper 44, the mixing drum 14, and/or other components of the concrete mixer truck 10. For example, the control assembly 76 may include overhead controls (e.g., in a forward overhead position) that allow an occupant of the cab 18 to toggle a switch from a 'Close' position to an 'Open' position to open and close the charge hopper 42 and/or the discharge hopper 44. In some embodiments, the control assembly 76 includes a user interface with a display and an operator input. The display may be configured to display a graphical user interface, an image, an icon, or still other information. In one embodiment, the display includes a graphical user interface configured to provide general information about the concrete mixer truck 10 (e.g., vehicle speed, fuel level, warning lights, etc.). The graphical user interface may also be configured to display a current mode of operation, various potential modes of operation, or still other information relating to a transmission, modules, the drive system 20, and/or other components of the concrete mixer truck 10.

An air tank 96 is coupled to and supported by the chassis 12 and positioned directly beneath the mixing drum 14. The air tank 96 is configured to store compressed air (e.g., for use in an air brake system, for use when raising and lowering a pusher axle assembly, etc.). A water tank 90 extends laterally across the length of the chassis 12, forward of the air tank 96. The water tank 90 is coupled to the frame rails 40 and positioned beneath the mixing drum 14. The water tank 90 may be used to supply water to wash the concrete mixer truck 10 after pouring a concrete load and/or to add water to the concrete within the mixing drum 14 at the construction site and/or during transit, among other uses.

The drum assembly 6 is configured to store, mix and dispense concrete. The drum assembly 6 includes the mixing drum 14, a drum driver 114, and the hopper assembly 8. The mixing drum 14 extends longitudinally along a majority of the length of concrete mixer truck 10 and may be angled relative to the frame rails 40 (e.g., when viewed from the side of concrete mixer truck 10). The mixing drum 14 has a first end 36 that is positioned toward the front end 22 of the concrete mixer truck 10 and coupled to the front pedestal 16 (e.g., support post, support column, etc.). The first end 36 may at least partially extend over the cab 18. The first end 36 defines a drum opening 72 in communication with the hopper assembly 8 through which concrete may flow (e.g., between the charge hopper 42, the mixing drum 14, the discharge hopper 44, the main chute 46, and extension chutes 48, etc.). The mixing drum 14 has a second end 38 that is positioned toward the rear end 24 of the concrete mixer truck 10 and coupled to the rear pedestal 26 (e.g., support post, support column, etc.). The mixing drum 14 may be rotatably coupled to front pedestal 16 (e.g., with a plurality of wheels or rollers, etc.) and rear pedestal 26 (e.g., with a drum drive transmission, etc.). Each of the front pedestal 16 and the rear pedestal 26 may be a part of a superstructure of the concrete mixer truck 10. The superstructure further includes the frame 28 and the chassis 12. In other embodiments, the mixing drum 14 is otherwise coupled to the frame rails 40. Although the concrete mixer truck 10 illustrated in FIGS. 1-3 is a front discharge concrete mixer vehicle, it is to be understood that in other embodiments the concrete mixer truck 10 may include a drum assembly 6 having any other discharge arrangement (e.g., rear discharge).

The front pedestal 16 includes an upper portion 152 and a lower portion 154. The upper portion 152 is coupled to and supports the hopper assembly 8. The lower portion 154 is coupled to the frame rails 40 and supports the upper portion 152 of the front pedestal 16 and the first end 36 of the mixing drum 14. The rear pedestal 26 includes an upper portion 162 and a lower portion 164. The lower portion 164 is coupled to the frame rails 40 and supports the upper portion 162. The upper portion 162 supports a bottom interface of a drum drive transmission 140 (e.g., a bottom portion of the housing thereof) and/or the second end 38 of the mixing drum 14. In some embodiments, the rear pedestal 26 includes a pair of legs extending between the frame rails 40 and the drum drive transmission 140.

The drum opening 72 at the first end 36 of the mixing drum 14 is configured to receive a mixture, such as a concrete mixture, or mixture ingredients (e.g., cementitious material, aggregate, sand, etc.) such that the mixture can enter and exit an internal volume 30 of the mixing drum 14. The mixing drum 14 may include a mixing element (e.g., fins, etc.) positioned within the internal volume 30. The mixing element may be configured to (i) agitate the contents of mixture within the mixing drum 14 when the mixing drum 14 is rotated in a first direction (e.g., counterclockwise, clockwise, etc.) and (ii) drive the mixture within the mixing drum 14 out through the drum opening 72 when the mixing drum 14 is rotated in an opposing second direction (e.g., clockwise, counterclockwise, etc.). During operation of the concrete mixer truck 10, the mixing elements of the mixing drum 14 are configured to agitate the contents of a mixture located within the internal volume 30 of the mixing drum 14 as the mixing drum 14 is rotated in a counterclockwise and/or a clockwise direction by the drum driver 114.

The drum driver 114 is configured to provide an input (e.g., a torque, etc.) to the mixing drum 14 to rotate the mixing drum 14 relative to the chassis 12. The drum driver 114 may be configured to selectively rotate the mixing drum 14 clockwise or counterclockwise, depending on the mode of operation of the concrete mixer truck 10 (i.e., whether concrete is being mixed or dispensed). The drum driver 114 is coupled to a rear or base portion of the second end 38 of the mixing drum 14 and a top end of the lower portion 164 and/or a lower end of the upper portion 162 of the rear pedestal 26. The drum driver 114 includes a transmission, shown as drum drive transmission 140, and a driver, shown as drum drive motor 130, coupled to drum drive transmission 140. The drum drive transmission 140 extends rearward (e.g., toward the rear end 24 of the concrete mixer truck 10, toward the engine module 110, etc.) from the second end 38 of mixing drum 14 and the drum drive motor 130 extends rearward from drum drive transmission 140. In some embodiments, the drum drive motor 130 is a hydraulic motor. In other embodiments, the drum drive motor 130 is another type of actuator (e.g., an electric motor, etc.). The drum drive motor 130 is configured to provide an output torque to the drum drive transmission 140, according to an exemplary embodiment, which rotates the mixing drum 14 about a rotation axis. The drum drive transmission 140 may include a plurality of gears (e.g., a planetary gear reduction set, etc.) configured to increase the turning torque applied to the mixing drum 14, according to an exemplary embodiment. The plurality of gears may be disposed within a housing. In some embodiments, a drum drive pump and/or accessory pump may be configured to receive rotational mechanical energy and output a flow of pressurized hydraulic fluid to drive one or more components of the concrete mixer truck 10.

The hopper assembly 8 is positioned at the drum opening 72 of the mixing drum 14. The hopper assembly 8 is configured to introduce materials into and allow the materials to flow out of the internal volume 30 of the mixing drum 14 of the concrete mixer truck 10. The hopper assembly 8 is configured to prevent loss of material or spillage when the material enters and exits the mixing drum 14. The hopper assembly 8 includes the charge hopper 42, the discharge hopper 44, a hopper actuator 66, a platform 54, and the main chute 46, which are positioned above at least partially forward of the cab 18 of the concrete mixer truck 10. The charge hopper 42 is configured to direct the materials (e.g., cement precursor materials, etc.) into the drum opening 72 of the mixing drum 14. The discharge hopper 44 is configured to dispense mixed concrete from the internal volume 30 of the mixing drum 14 to the main chute 46 and, ultimately, the desired location.

The platform 54 includes a perforated surface that surrounds the charge hopper 42 and the discharge hopper 44. In some embodiments, the platform 54 includes an asymmetric base. The platform 54 includes platform sides extending beneath the perforated surface. A guardrail 56 is coupled to the platform 54 and follows the contour of a periphery of the platform 54. The platform 54 is situated at a position near the drum opening 72 of the mixing drum 14 to facilitate access by the operator to the drum opening 72, the internal volume 30, the charge hopper 42, the discharge hopper 44, and/or the main chute 46. In some embodiments, the concrete mixer truck 10 includes a ladder 98 that extends downward from a side of the platform 54 to allow an operator to climb and reach the platform 54.

The charge hopper 42 includes a first portion 52 that is configured to receive materials during a charging/loading operation. The first portion 52 has a rim 58 (e.g., opening) formed at a free end of the first portion 52. The charge hopper 42 includes a second portion 53 aligned with the bottom of the first portion 52. According to an exemplary embodiment, the charge hopper 42 is selectively repositionable/movable. In some embodiments, the charge hopper 42 is configured to rotate about a horizontal, lateral axis. In some embodiments, the charge hopper 42 is configured to raise and lower vertically. Specifically, the charge hopper 42 is configured to lift, pivot, or otherwise move between a first position (e.g., a lowered position, loading position, a charging position, etc.) and a second position (e.g., a raised position, a dispensing/discharging position, a pivoted position, etc.) above or shifted from the first position. In the first position, the charge hopper 42 is configured to direct material (e.g., concrete, etc.) from a source positioned above the concrete mixer truck 10 (e.g., a batch plant, etc.) through the drum opening 72 and into the internal volume 30 of the mixing drum 14. The first position may also facilitate transport of the concrete mixer truck 10 by lowering the overall height of the concrete mixer truck 10. In the second position, the charge hopper 42 moves (e.g., lifts, pivots, etc.) away from the drum opening 72 and facilitates material flowing unobstructed out of the drum opening 72 and into the discharge hopper 44 and the main chute 46.

A hopper actuator 66 is positioned to move the charge hopper 42 between the first position and the second position. The hopper actuator 66 facilitates selectively controlling movement of the charge hopper 42 between the first position and the second position. The hopper actuator 66 is coupled to and extends between the charge hopper 42 and the platform 54. In some embodiments, the hopper actuator 66 is a hydraulic cylinder. In other embodiments, the hopper actuator 66 is another type of actuators (e.g., a pneumatic cylinder, a lead screw driven by an electric motor, an electric motor, etc.).

When receiving the material, the charge hopper 42 may be in the first position and the main chute 46 may be in a first configuration (e.g., a transport configuration, a stored configuration, etc.). Accordingly, material can be deposited into the charge hopper 42, and the charge hopper 42 directs the material into the internal volume 30 of the mixing drum 14 through the drum opening 72. While material is being added to the mixing drum 14, the drum driver 114 may be operated to drive the mixing drum 14 to agitate the material and facilitate fully loading/packing the mixing drum 14. Alternatively, the mixing drum 14 may be stationary while material is added to the mixing drum 14. When discharging and the charge hopper 42 is in the second position, the discharge hopper 44 funnels material from the mixing drum 14 into the main chute 46.

The main chute 46 functions as an outlet of the mixing drum 14 and is used to direct concrete dispensed from the internal volume 30 of the mixing drum 14 and through the discharge hopper 44 to a target location near the concrete mixer truck 10. The main chute 46 is pivotally coupled to the platform 54 and/or the discharge hopper 44 such that the main chute 46 is configured to rotate about both a vertical axis and a horizontal axis. The main chute 46 includes a base section 124 that may be pivotally coupled to the platform 54 and/or the discharge hopper 44. An extension chute 48 (e.g., a folding section, a second chute section, etc.) is pivotally coupled to the distal end of the base section 124. In some embodiments, a plurality of extension chutes 48 are pivotally connected to one another. One or more removable/detachable extension chutes 68 may be selectively coupled to the distal end of the extension chute 48. The main chute 46 is selectively reconfigurable between a first configuration (e.g., a storage configuration, a transport configuration, etc.)

and a second configuration (e.g., a use configuration, a dispensing configuration, etc.). In the first configuration, (i) the base section 124 may be selectively oriented substantially horizontal and extending laterally outward, (ii) the extension chute 48 may be selectively pivoted relative to the base section 124 and extending substantially vertically, and (iii) the removable extension chutes 68 may be removed from the extension chute 48 and stored elsewhere in the concrete mixer truck 10 (e.g., coupled to the chassis 12 beneath the mixing drum 14, etc.). In the first configuration, the main chute 46 may, therefore, minimally obscure the view of an operator positioned within the cab 18. In the second configuration, (i) the extension chute 48 may be pivoted relative to the base section 124 from the substantially vertical orientation to a substantially horizontal orientation such that the base section 124 and the extension chute 48 are aligned with one another to form a continuous path through which material can flow, and (ii) one or more of the removable extension chutes 68 may be coupled to the distal end of the extension chute 48 to increase the length of the main chute 46 (e.g., to distribute concrete further away from the concrete mixer truck 10, etc.).

A first chute actuator 122 (e.g., a chute raising/lowering actuator, etc.) is coupled to and extends between the main chute 46 (e.g., a distal end thereof, etc.) and the chassis 12. In some embodiments, the first chute actuator 122 is extends between the main chute 46 and the front bumper 158. The first chute actuator 122 is configured to raise and lower the main chute 46 to control the orientation of the main chute 46 relative to a horizontal plane (e.g., the ground, etc.). In some embodiments, the first chute actuator 122 is a pair of opposing hydraulic cylinders. In other embodiments, the first chute actuator 122 is another type of actuator (e.g., a pneumatic cylinder, a lead screw driven by an electric motor, a single hydraulic cylinder, etc.). In some embodiments, the first chute actuator 122 and the main chute 46 are both configured to rotate about the same or substantially the same vertical axis (e.g., as the main chute 46 is pivoted about the vertical axis as described in more detail herein).

A second chute actuator 94 (e.g., a chute pivot/rotation actuator, etc.) is coupled to the base section 124 of the main chute 46 and the platform 54. The second chute actuator 94 is configured to rotate the main chute 46 about a vertical axis. The second chute actuator 94 is configured to move the distal end of the main chute 46 through an arc along the left, front, and right sides of the chassis 12 (e.g., a 150 degree arc, a 180 degree arc, a 210 degree arc, etc.). In one embodiment, the second chute actuator 94 is a hydraulic motor. In other embodiments, the second chute actuator 94 is another type of actuator (e.g., a pneumatic motor, an electric motor, etc.).

A third chute actuator 78 (e.g., a chute folding/unfolding actuator, etc.) is configured to reposition (e.g., extend and retract, fold and unfold, etc.) the extension chute 48 relative to the base section 124 of the main chute 46. The third chute actuators 78 may be coupled to and extend between the base section 124 and the extension chute 48. In some embodiments, the third chute actuator 78 includes a plurality of actuators positioned to reposition a first extension chute 48 relative to the base section 124 and one or more second extension chutes 48 relative to the first extension chute 48. The first chute actuator 122, the second chute actuator 94, and the third chute actuator 78 facilitate selectively reconfiguring the main chute 46 between the first configuration and the second configuration. In some embodiments, a controller (e.g., joystick) is configured to facilitate providing commands to control operation of the first chute actuator 122, the second chute actuator 94, and the third chute actuator 78 to direct the main chute 46 and concrete flow therefrom. In some embodiments, a hopper pump may be coupled to the chassis 12 and configured to provide pressurized hydraulic fluid to power the first chute actuator 122, the second chute actuator 94, and/or the third chute actuator 78. The hopper pump may be a variable displacement pump or a fixed displacement pump. Additionally or alternatively, a pneumatic pump and/or an electrical storage and/or generation device is used to power one or more of the first chute actuator 122, the second chute actuator 94, and/or the third chute actuator 78.

Once at the job site, the concrete mixer truck 10 may be configured to dispense the material to a desired location (e.g., into a form, onto the ground, etc.). The charge hopper 42 may be repositioned into the second position from the first position by the hopper actuator 66. The extension chute(s) 48 may be extended by the third chute actuator(s) 78 to reconfigure the main chute 46 into the second configuration from the first configuration. An operator can then couple one or more removable extension chutes 68 to the distal end of the extension chute 48 to increase the overall length of the main chute 46 (as necessary). Once the main chute 46 is in the second configuration, the operator can control the first chute actuator 122 and/or the second chute actuator 94 to adjust the orientation of the main chute 46 (e.g., about a vertical axis, about a lateral axis, etc.) and thereby direct the material onto the desired location. Once the main chute 46 is in the desired orientation, the operator can control the drum driver 114 to rotate the mixing drum 14 in the second direction, expelling the material through the drum opening 72, into the discharge hopper 44, and into the main chute 46. The operator may control the speed of the mixing drum 14 to adjust the rate at which the material is delivered through the main chute 46. Throughout the process of dispensing the material, the operator can change the location onto which the material is dispensed by varying the orientation of the main chute 46 and/or by controlling the drive system 20 to propel/move the concrete mixer truck 10.

The drive system 20 is configured to propel the concrete mixer truck 10 and may drive other systems of the concrete mixer truck 10 (e.g., the drum driver 114, etc.). The drive system 20 includes driven tractive assemblies that include a front axle assembly 132 and a pair of rear axle assemblies 134, each coupled to various wheels 4. In some embodiments, the drive system 20 includes a driveshaft coupled to the front axle assembly 132 and/or the rear axle assemblies 134. The front axle assembly 132 and the rear axle assemblies 134 are coupled to the power plant module 62 through the drive system 20 such that the front axle assembly 132 and the rear axle assemblies 134 at least selectively receive mechanical energy (e.g., rotational mechanical energy) and propel the concrete mixer truck 10. In some embodiments, a pusher axle assembly 168 (e.g., tag axle assembly, etc.) is configured to be raised and lowered to selectively engage the support surface (e.g., based on the loading of the concrete mixer truck 10, etc.). Such a configuration distributes the pressure exerted on the ground by the concrete mixer truck 10, which may be required, for example, when traveling through certain municipalities under load.

The power plant module 62 (e.g., prime mover module, driver module, etc.) is configured to supply rotational mechanical energy to drive the concrete mixer truck 10. The power plant module 62 is coupled to the chassis 12 and positioned near the longitudinal center of the concrete mixer truck 10, beneath the mixing drum 14. According to an exemplary embodiment, the power plant module 62 receives a power input from the engine module 110. In some embodiments, the power plant module 62 includes a transmission and/or an electromagnetic device (e.g., an electrical machine, a motor/generator, etc.) coupled to the transmission. In some embodiments, the transmission and the electromagnetic device are integrated into a single device (e.g., an electromechanical infinitely variable transmission, an electromechanical transmission, etc.). The electromagnetic device is configured to provide a mechanical energy input to the transmission. By way of example, the electromagnetic device may be configured to supply a rotational mechanical energy input to the transmission (e.g., using electrical energy generated from the mechanical power input provided by the engine module 110, etc.). In some embodiments, the power plant module 62 and/or the drive system 20 includes additional pumps (hydraulic fluid pumps, water pumps, etc.), compressors (e.g., air compressors, air conditioning compressors, etc.), generators, alternators, and/or other types of energy generation and/or distribution devices configured to transfer the energy from the power plant module 62 to other systems.

The fuel system 108 is configured to provide fuel to the engine module 110 and/or other components of the concrete mixer truck 10. Specifically, the fuel system 108 may be configured to provide fuel to an engine 74 of the engine module 110. The engine 74 may use the fuel in an internal combustion process to generate a mechanical power output that is provided to the power plant module 62 (e.g., to generate electricity, to power onboard electric motors used to at least one of rotate wheel and tire assemblies, to drive the transmission etc.) and/or to power the drum driver 114. The fuel system 108 may include one or more valves, hoses, regulators, filters, and/or various other components configured to facilitate providing fuel to the engine 74. The fuel system 108 includes a container 126 (e.g., a vessel, reservoir, tank, etc.) that is configured to store a fluid (e.g., fuel, air, hydraulic fluid, etc.). The container 126 is disposed behind the drum driver 114 along the chassis 12. In other embodiments, the container 126 is coupled to a side of the rear pedestal 26. In some embodiments, the container 126 is coupled to the chassis 12 and positioned directly beneath the mixing drum 14. According to an exemplary embodiment, the container 126 includes a fuel tank that stores fuel used to power the engine 74. In some embodiments, the container 126 additionally or alternatively includes an air tank configured to store compressed air (e.g., for use in an air brake system, for use when raising and lowering the pusher axle assembly 168, etc.). In some embodiments, the container 126 additionally or alternatively includes a hydraulic tank configured to store hydraulic fluid for use in one or more hydraulic circuits (e.g., a hydraulic circuit that includes the drum driver 114, etc.).

A cover assembly 120 including a plurality of cover panels is positioned between the second end 38 of the mixing drum 14 and the engine module 110. The cover assembly 120 is disposed around the fuel system 108 (e.g., the container 126, etc.), the drum driver 114, and the rear pedestal 26. The cover assembly 120 is configured to protect the various internal components from debris. Such debris may be encountered while the concrete mixer truck 10 is driven along a roadway, for example. The cover assembly 120 may also protect the various internal components from damage due to collisions with trees, poles, or other structures at a jobsite or while transporting concrete. In some embodiments, all or some of the fuel system 108 is incorporated under a hood 86 of the engine module 110.

The engine module 110 is coupled to the frame rails 40 proximate the rear end 24 of the chassis 12. The engine module 110 is configured to directly, or indirectly, supply the various components of the concrete mixer truck 10 with the power needed to operate the concrete mixer truck 10. By way of example, the engine module 110 may be configured to provide mechanical energy (e.g., rotational mechanical energy) (i) to one or more components directly (e.g., via a power-take-off, etc.) to drive the one or more components (e.g., a hydraulic pump of the drum driver 114, etc.) and/or (ii) to the power plant module 62 to drive the one or more components indirectly. The engine module 110 may be defined by any number of different types of power sources. According to an exemplary embodiment, the engine module 110 includes the engine 74 coupled to the frame rails 40 and disposed within the hood 86. The engine 74 may include an internal combustion engine configured to utilize one or more of a variety of fuels (e.g., gasoline, diesel, bio-diesel, ethanol, natural gas, etc.) to output mechanical energy. In some embodiments, at least one of the drum drive motor 130, the first chute actuator 122, the second chute actuator 94, and the third chute actuator 78 is electrically driven (i.e., powered using electrical energy) rather than hydraulically driven.

In some embodiments, the engine module 110 additionally or alternatively includes multiple battery modules (e.g., batteries, capacitors, ultra-capacitors, etc.) spread throughout the concrete mixer truck 10, which cooperate to act collectively as an energy storage device. The engine module 110 can be charged through an onboard energy source (e.g., through use of an onboard generator powered by an internal combustion engine, by operating the electromagnetic device as a generator, during regenerative braking, through an onboard fuel cell, through an onboard solar panel, etc.) or through an external energy source (e.g., when receiving mains power from a power grid, etc.). In some embodiments, the concrete mixer truck 10 is a purely electric vehicle that does not include an internal combustion engine and, as such, is driven by electrical energy in all modes of operation. In such embodiments, the concrete mixer truck 10 may not include a fuel tank.

Multi-Function Joystick

Figure 5:
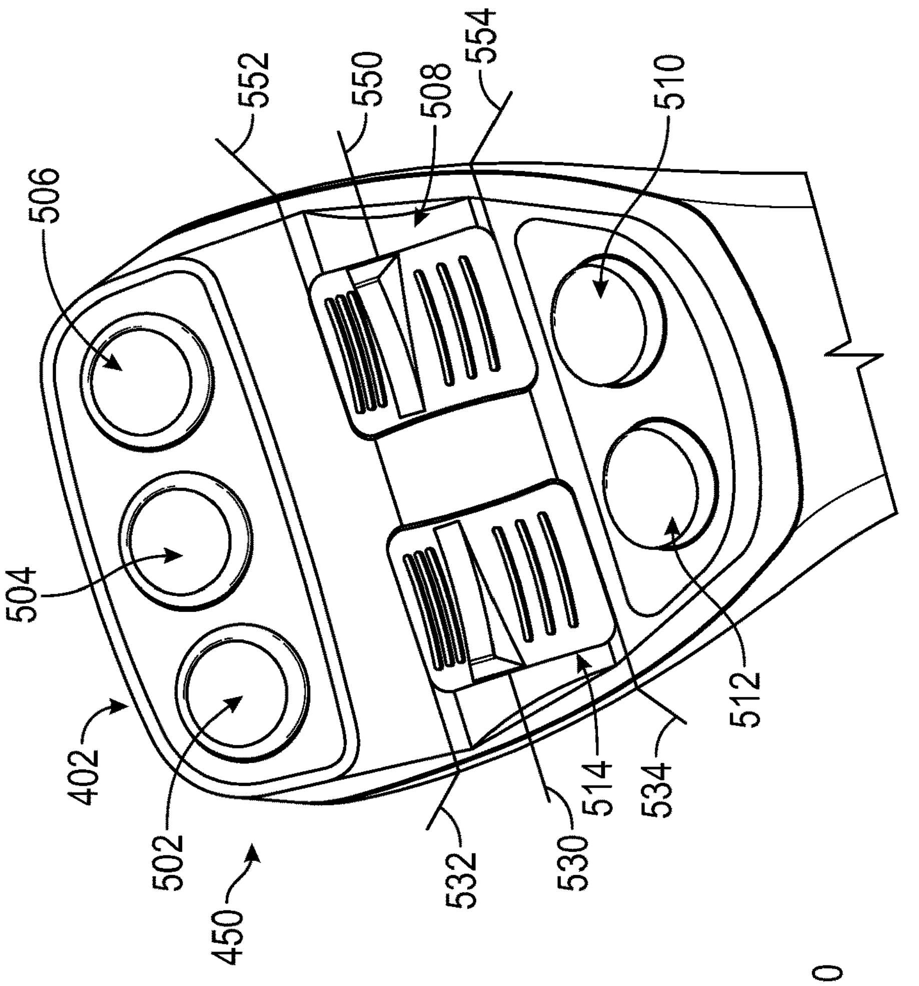
FIG. 5 is a detailed view of a portion of the user controller of FIG. 4, according to an exemplary embodiment.
Figure 4:
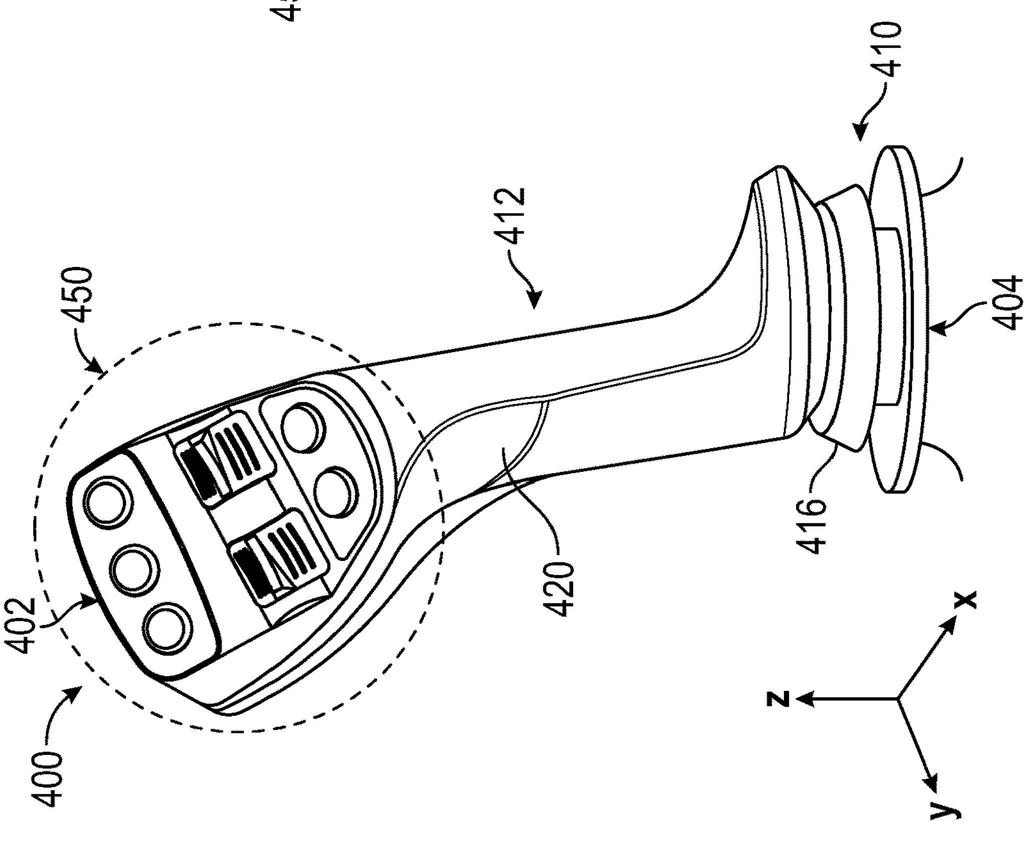
FIG. 4 is a perspective view of a user controller of the concrete mixer truck of FIG. 1, according to an example embodiment.

According to the exemplary embodiment shown in FIGS. 4 and 5, a user controller, shown as multi-function joystick 400, is configured to facilitate controlling multiple functions of multiple components of the concrete mixer truck 10. According to an exemplary embodiments, the multi-function joystick 400 is disposed in the housing 70 of the cab 18. In some embodiments, the multi-function joystick 400 is centrally positioned along a dash (e.g., panel) in the cab 18. In other embodiments, the multi-function joystick 400 is positioned toward the first lateral side 142 of the cab 18 so that the operator can better view the main chute 46 and other components. Generally, the multi-function joystick 400 includes more functionality and is more efficient than conventional control systems, such as a dash and/or overhead panel with switches, buttons, levers, and the like.

The multi-function joystick 400 may facilitate performing various functions including: (i) controlling actuation of the first chute actuator 122 to pivot the main chute 46 about a vertical axis (e.g., through an arc, etc.), (ii) controlling actuation of the second chute actuator 94 to pivot (e.g., raise, lower, etc.) the main chute 46 about a lateral axis, (iii) controlling actuation of the third chute actuator 78 to reposition (e.g., pivot, fold, unfold, etc.) the extension chute 48 relative to the base section 124 of the main chute 46, (iv) controlling the drum driver 114 to control a direction and/or speed of the mixing drum 14, (v) controlling the hopper actuator 66 to control the position of the charge hopper 42

(e.g., between the first position and the second position, etc.), (vi) controlling modes of the transmission of the power plant module 62 (e.g., neutral, forward, reverse, etc.), and/or (vii) controlling movement of the concrete mixer truck 10 (e.g., a speed, direction, etc. thereof). By having such a wide variety of controls and control functionality in a single device, the multi-function joystick 400 consolidates the motion, focus, and concentration of the operator to a single location (i.e., the multi-function joystick 400) to control a wide variety of functions and operations of the concrete mixer truck 10. The multi-function joystick 400 may be used in tandem with other control systems (e.g., a driver's wheel, a switch configured to control the drum assembly 6, a lever configured to control the fuel system 108, an accelerator pedal, a brake pedal, etc.) to control various other components of the concrete mixer truck 10.

The multi-function joystick 400 has an elongated body having a top end 402 and a bottom end 404. The elongated body includes a base portion 410 at the bottom end 404, a control portion 450 at the top end 402, and a shaft 412 extending between the base portion 410 and the control portion 450. The base portion 410 includes a motion assembly 416. In some embodiments, the motion assembly 416 is configured to allow for and capture movement of the multi-function joystick 400 by an operator in an x-y plane (i.e., an x-direction and a y-direction). In some embodiments, the motion assembly 416 allows for the multi-function joystick 400 to be rotated (e.g., twisted) about a z-direction (i.e., a vertical, longitudinal axis defined by the shaft 412). The x-y coordinates pinpoint the movement and position of the multi-function joystick 400 as it is moved by the operator. In some embodiments, the multi-function joystick 400 captures the movement through use of an analog-to-digital converter, an analog-to-digital converter chip, optical sensors, light emitting diodes, and/or other analog capturing and motion registering implementations. The shaft 412 includes a curved, grip portion 420 that is configured to receive a hand of an operator. In some embodiments, the curved, grip portion 420 is ergonomically shaped to provide comfort and usability when the operator moves the shaft 412 to control one or more components of the concrete mixer truck 10.

According to an exemplary embodiment, movement of the multi-function joystick 400 in the x-direction, the y-direction, and/or the z-direction causes movement of a component of the concrete mixer truck 10. In some embodiments, the movement of the multi-function joystick 400 controls the rotation and elevation of the main chute 46. By way of example, the movement of the multi-function joystick 400 in the y-direction (e.g., left and right) may be operably connected to the second chute actuator 94 such that movement of the multi-function joystick 400 in the y-direction moves the main chute 46 left and right. By way of another example, the movement of the multi-function joystick 400 in the x-direction (e.g., front and back) may be operably connected to the first chute actuator 122 such that movement of the multi-function joystick 400 in the x-direction moves the main chute 46 up and down. In other embodiments, the multi-function joystick 400 has different modes (e.g., capable of being toggled between via a button, trigger, etc.), with each mode configured such that the movement of the multi-function joystick 400 moves a different component of the concrete mixer truck 10 associated with the selected mode. For example, in a first mode, movement of the multi-function joystick 400 may cause movement of the main chute 46 and, in a second mode, movement of the multi-function joystick 400 may cause movement of another component (e.g., the drive system 20, the charge hopper 42, the mixing drum 14, etc.).

The control portion 450 includes a button interface having a plurality of buttons, adjusters, and/or dials (e.g., controls) that are configured to facilitate controlling various components of the concrete mixer truck 10. Having the controls concentrated on the top end 402 of the multi-function joystick 400 alleviates the operator from having to move their focus from the component(s) being used for accomplishing a task (e.g., move, maneuver, receive, dispense, etc.) as the controls necessary for controlling the component of the task are disposed on the control portion 450. Specifically, the control portion 450 includes a plurality of thumb-activated (or other finger-activated) controls. The controls include a chute fold control 502, a chute unfold control 504, a charge hopper close control 506, a drive/transmission control 508, a charge hopper open control 510, a mixer drum pause control 512, and a mixer drum discharge/charge control 514.

According to the exemplary embodiment shown, the chute fold control 502, the chute unfold control 504, the charge hopper close control 506, the charge hopper open control 510, and the mixer drum pause control 512 are push/press activated buttons. However, it should be understood that, in other embodiments, the chute fold control 502, the chute unfold control 504, the charge hopper close control 506, the charge hopper open control 510, and/or the mixer drum pause control 512 could be implemented using a wide variety of different types of controls including scrollable controls, rotatable controls, trigger controls, switch controls, d-pad/directional controls, and/or still other manual-activation controls. According to the exemplary embodiment shown, the drive/transmission control 508 and the mixer drum discharge/charge control 514 are dial/scrollable type controls. However, it should be understood that, in other embodiments, the drive/transmission control 508 and the mixer drum discharge/charge control 514, could be implemented using a wide variety of different types of controls including push/press button controls, rotatable controls, trigger controls, switch controls, d-pad/directional controls, and/or still other manual-activation controls. Further, it should be understood that one or more functions provided by a single control could be implemented in multiple, separate controls. Conversely, one or more functions shown as multiple controls could be implemented in a single, multifunction control.

According to an exemplary embodiment, the chute fold control 502 and the chute unfold control 504 are operably connected to the third chute actuator 78 to facilitate controlling folding and unfolding of the extension chute 48 relative to the base section 124 of the main chute 46 via the multi-function joystick 400. By way of example, when the chute unfold control 504 is pressed, the third chute actuator 78 may be engaged (e.g., extended, pivoted, etc.) to cause the extension chute 48 to pivot from the first configuration (e.g., the transport configuration, the stored configuration, etc.) to the second configuration (e.g., the use configuration, the dispensing configuration, etc.). By way of another example, when the chute fold control 502 is pressed, the third chute actuator 78 may be engaged (e.g., retracted, pivoted, etc.) to cause the extension chute 48 to pivot from the second configuration to the first configuration.

According to an exemplary embodiment, the charge hopper close control 506 and the charge hopper open control 510 are operably connected to the hopper actuator 66 to facilitate repositioning the charge hopper 42 between the first position (e.g., the lowered position, the loading position, the charging position, etc.) and the second position (e.g., the raised position, the dispensing/discharging position, the pivoted position, etc.). By way of example, when the charge hopper close control 506 is pressed, the hopper actuator 66 may be engaged (e.g., extended, pivoted, etc.) to reposition (e.g., lift, pivot, etc.) the charge hopper 42 from the first position to the second position. In the second position, the charge hopper 42 is in a configuration that allows for the discharge of material from the internal volume 30 of the mixing drum 14 into the discharge hopper 44 and the main chute 46. By way of another example, when the charge hopper open control 510 is pressed, the hopper actuator 66 may be engaged (e.g., retracted, rotated, etc.) to reposition (e.g., lower, pivot, etc.) the charge hopper 42 from the second position to the first position. In the first position, the charge hopper 42 is in a high-flow configuration allowing for unobstructed flow of material from the charge hopper 42 into the internal volume 30 of the mixing drum 14.

According to an exemplary embodiment, the mixer drum pause control 512 and the mixer drum discharge/charge control 514 are operably connected to the drum driver 114 to facilitate controlling movement of the mixing drum 14. By way of example, when the mixer drum pause control 512 is pressed, the drum driver 114 stops operation causing the mixing drum 14 to stop rotating. The mixer drum discharge/charge control 514 is a dial that can be moved in a first direction 532 or a second direction 534 from a neutral position 530. According to an exemplary embodiment, the mixer drum discharge/charge control 514 is a spring-return dial. Accordingly, when the mixer drum discharge/charge control 514 is moved in the first direction 532 or the second direction 534 and then subsequently released, the mixer drum discharge/charge control 514 is biased toward and returns to the neutral position 530. By way of example, when the mixer drum discharge/charge control 514 is moved in the first direction 532 (e.g., when the mixing drum 14 is stationary, etc.), the drum driver 114 rotates the mixing drum 14 in a first rotational direction (e.g., a charge/mix direction, etc.). In some embodiments, as the mixer drum discharge/charge control 514 is moved further in the first direction 532, the mixing drum 14 is rotated more quickly in the first rotational direction. When the mixer drum discharge/charge control 514 is released, the mixer drum discharge/charge control 514 returns to the neutral position 530 and the mixing drum 14 continues to rotate in the first rotational direction. In some implementations, once the mixing drum 14 is rotating in the first rotational direction, moving the mixer drum discharge/charge control 514 toward the second direction 534 may slow the rotation of the mixing drum 14 in the first rotational direction (e.g., until zero speed is reached and then the rotational direction may flip, etc.). By way of another example, when the mixer drum discharge/charge control 514 is moved in the second direction 534 (e.g., when the mixing drum 14 is stationary, etc.), the drum driver 114 rotates the mixing drum 14 in a second rotational direction (e.g., a discharge direction, etc.) opposite the first rotational direction. In some embodiments, as the mixer drum discharge/charge control 514 is moved further in the second direction 534, the mixing drum 14 is rotated more quickly in the second rotational direction. When the mixer drum discharge/charge control 514 is released, the mixer drum discharge/charge control 514 returns to the neutral position 530 and the mixing drum 14 continues to rotate in the second rotational direction. In some implementations, once the mixing drum 14 is rotating in the second rotational direction, moving the mixer drum discharge/charge control 514 toward the first direction 532 may slow the rotation of the mixing drum 14 in the second rotational direction (e.g., until zero speed is reached and then the rotational direction may flip, etc.).

The drive/transmission control 508 is operably connected to the transmission of the drive system 20 to facilitate controlling a mode of the transmission between a forward mode, a neutral mode, and a reverse mode. The drive/transmission control 508 is a dial that can be moved in a first direction 552 or a second direction 554 from a neutral position 550. According to an exemplary embodiment, the drive/transmission control 508 is a detent dial. Accordingly, when the drive/transmission control 508 is moved in the first direction 552, the drive/transmission control 508 engages a drive detent, securing the drive/transmission control 508 in a drive position (i.e., the drive/transmission control 508 is not biased into the neutral position 550 when released) and shifting the transmission of the drive system 20 into a drive mode. When the drive/transmission control 508 is moved in the second direction 554, the drive/transmission control 508 engages a reverse detent, securing the drive/transmission control 508 in a reverse position (i.e., the drive/transmission control 508 is not biased into the neutral position 550 when released) and shifting the transmission of the drive system 20 into a reverse mode. When the drive/transmission control 508 is moved to the neutral position 550, the drive/transmission control 508 engages a neutral detent, securing the drive/transmission control 508 in the neutral position 550 and shifting the transmission of the drive system 20 into a neutral mode. In some embodiments, an indicator light on the drive/transmission control 508 illuminates based to the position thereof (e.g., illuminates when in the neutral position 550, illuminates different colors based on the position, etc.).

Water Tracking System

Figure 6:
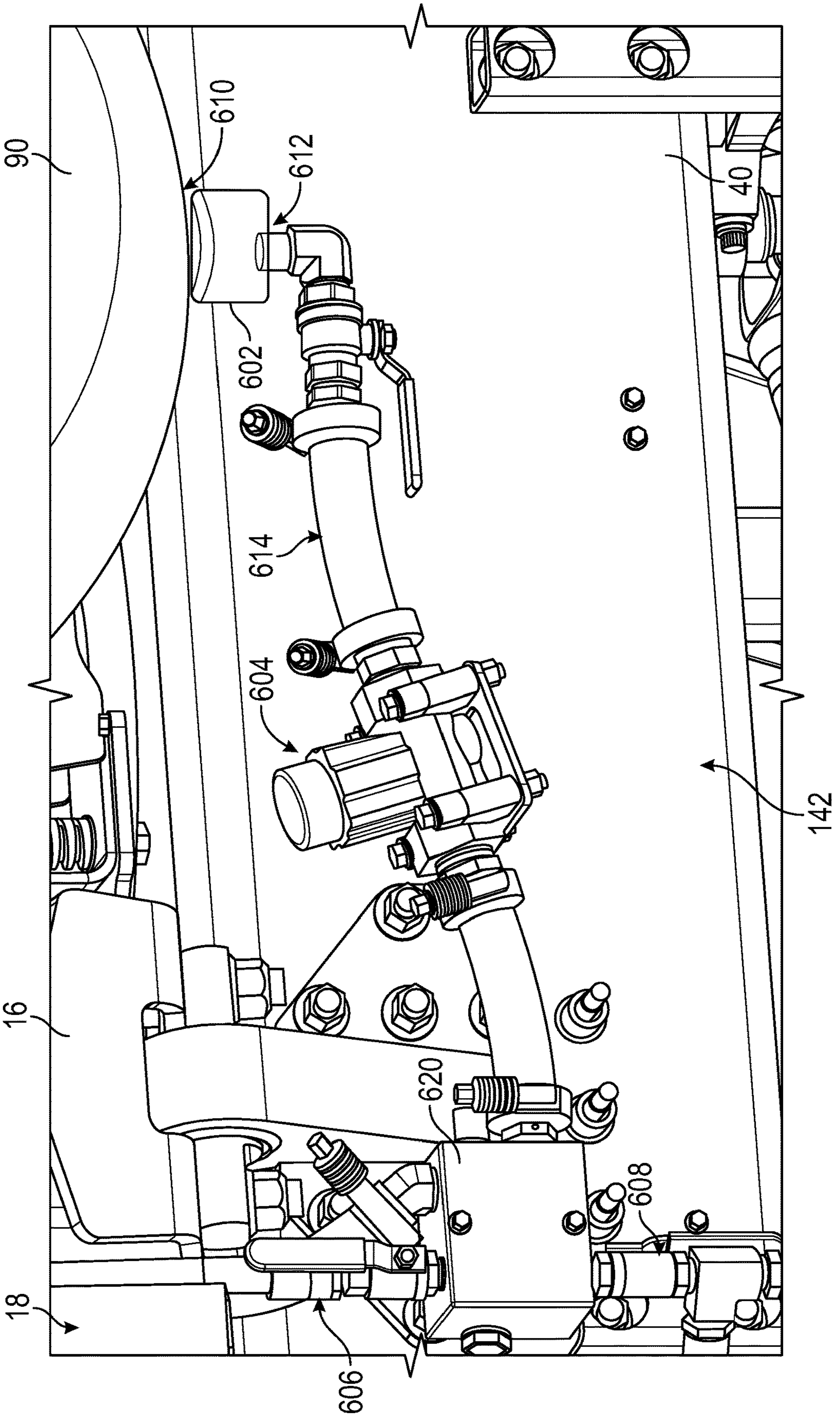
FIG. 6 is a side perspective view of a water tracking system of the concrete mixer truck of FIG. 1, according to an example embodiment.

According to the exemplary embodiment shown in FIG. 6, the concrete mixer truck 10 includes a water tracking system 602. The water tracking system 602 is positioned between an outlet 610 of the water tank 90 and an inlet 612 of water piping 614, and upstream of a water pump 604. In some embodiments, the water tracking system 602 has a fluid passageway extending therethrough, with a first end or inlet of the fluid passageway fluidly connected to the outlet 610 of the water tank 90 and a second end or outlet of the fluid passageway connected to the inlet 612 of the water piping 614. In other embodiments, the water tracking system 602 is or includes a probe that is disposed within/along the water piping 614. According to an exemplary embodiment, the water tracking system 602 is configured to track water flow flowing out of the water tank 90 and through the water pipping 614. According to the exemplary embodiment shown in FIG. 6, the water tracking system 602 is implemented at a single location along the water systems of the concrete mixer truck 10, rather than at multiple locations.

The water pump 604 is positioned downstream of the water tank 90 and upstream of a water supply junction 620. The water pump 604 is configured to drive the water from the water tank 90 through a mixing drum water system 606 or a washdown system 608. The water pump 604 may be a variable displacement pump or a fixed displacement pump.

The water supply junction 620 receives the water from the water tank 90 and directs the water in a first direction toward the mixing drum water system 606 and/or a second direction toward the washdown system 608. The mixing drum water system 606 is operably connected to the mixing drum 14 to supply water from the water tank 90 to the mixing drum 14. The water may be used in the mixing drum 14 to add water to the concrete mixture, lubricate the internal portions of the mixing drum 14, and/or increase water content in the concrete mixture being dispensed, among other uses. The washdown system 608 is operably connected to one or more hosing and cleaning system components that are used to wash various components of the concrete mixer truck 10. The water supply junction 620 may switch between supplying water to the mixing drum water system 606 and the washdown system 608 by pressing a button, flipping a switch, activating a valve, or other activation/deactivation mechanisms. In some embodiments, the water tracking system 602 is implemented at the water supply junction 620 downstream of the water pump 604.

Figure 7:
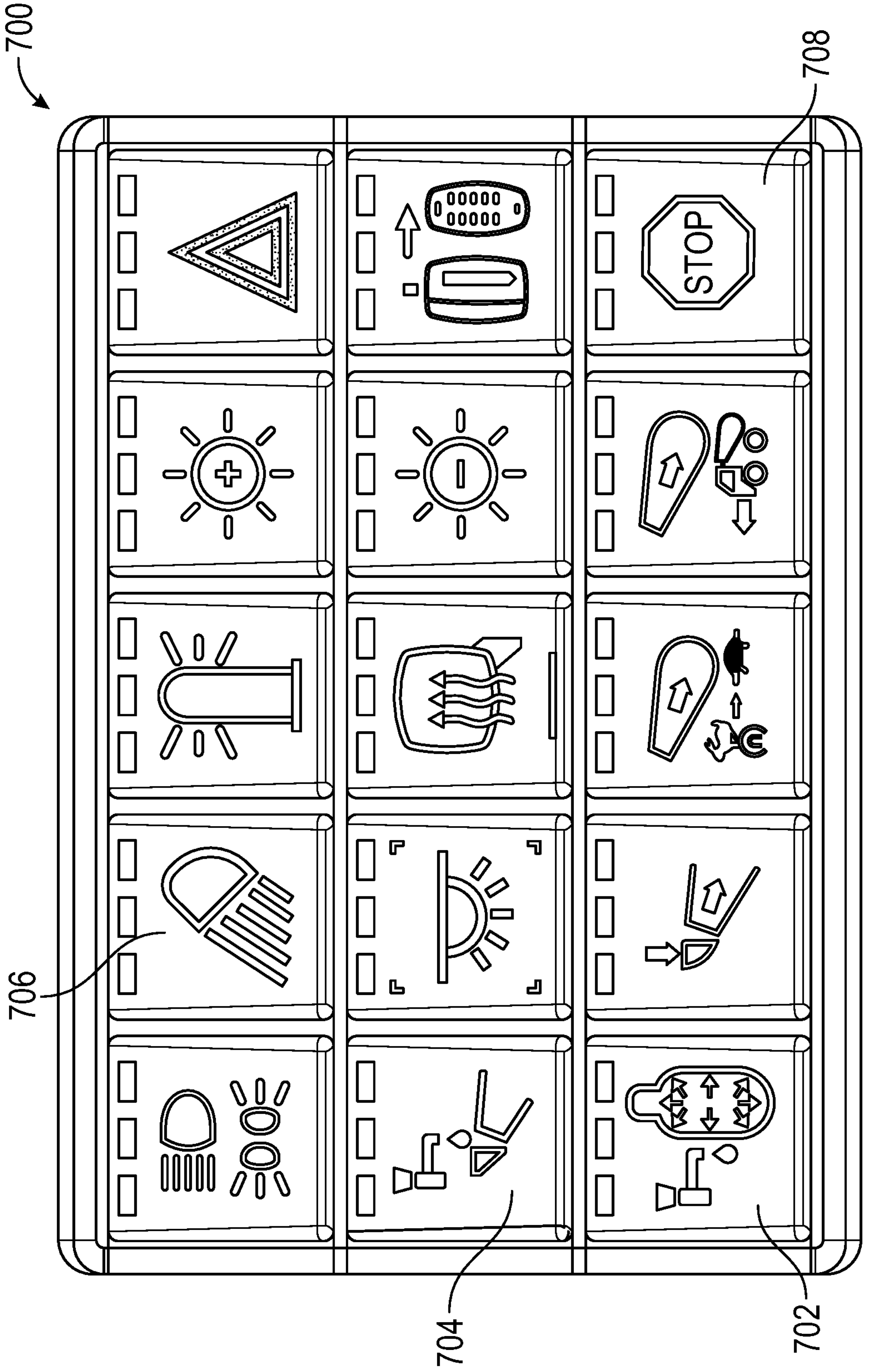
FIG. 7 is a detailed view of a user interface provided by a control panel used for controlling the water tracking system of FIG. 6, according to an example embodiment.

According to the exemplary embodiment shown in FIG. 7, the concrete mixer truck 10 includes a control panel 700. The control panel 700 may be disposed along a dash or overhead display in the cab 18 of the concrete mixer truck 10. The control panel 700 includes a user interface having physical buttons and/or having a touchscreen display that provides a graphical user interface ("GUI") with selectable GUI-defined features. The user interface of the control panel 700 includes an add water control 702, an alternative add water control 704, a washdown water control 706, and a stop control 708. The control panel 700 is communicably coupled to the water tracking system 602, according to an exemplary embodiment. The coupling may be a wired or wireless connection to the water tracking system 602. Engaging the features of the control panel 700 such pressing a control button thereon may cause a change with the water tracking system 602.

In practice, the operator presses or initiates the add water control 702 to cause the water tracking system 602 to identify the water flowing out of the water tank 90 through the water pipping 614 as water that will go to the mixing drum 14 through the mixing drum water system 606. The water tracking system 602 may capture amount of water, flow rate of water, duration of usage, and other data from the water flowing from the water tank 90, through the water tracking system 602, and to the mixing drum water system 606. The operator may depress or press again the add water control 702 to stop the water tracking system 602 from identifying the water flowing out of the water tank 90 through the water pipping 614 as water that will go to the mixing drum 14 through the mixing drum water system 606. The operator may press the washdown water control 706 to stop the water tracking system 602 from identifying the water flowing out of the water tank 90 through the water pipping 614 as water that will go to the mixing drum 14 through the mixing drum water system 606 and transition the water tracking system 602 to identify the water flowing out of the water tank 90 through the water pipping 614 as water that will go to a hose or other component (e.g., nozzles, etc.) in the washdown system 608. In some embodiments, the operator may press the stop control 708 to stop the water tracking system 602 from identifying the water flowing out of the water tank 90 through the water pipping 614 as water that will go to the mixing drum 14 through the mixing drum water system 606.

In some embodiments, the alternative add water control 704 is used to cause the water tracking system 602 to identify the water flowing out of the water tank 90 through the water pipping 614 as water that will go to the mixing drum 14 through the mixing drum water system 606. In some embodiments, any one of the plurality of controls, including the add water control 702, alternative add water control 704, washdown water control 706, and stop control 708 may be implemented on a joystick, such as the multifunction joystick 400 of FIG. 4. The water tracking system 602 may catalogue the water that flows to the mixing drum water system 606 so that it may be analyzed and compared to overall water usage.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the concrete mixer truck 10 and the components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A concrete mixer vehicle comprising:

a chassis;

an engine coupled to the chassis;

a front axle coupled to the chassis;

a rear axle coupled to the chassis;

a transmission coupled to the engine and at least one of the front axle or the rear axle, the transmission selectively operable in a plurality of modes including a drive mode, a neutral mode, and a reverse mode;

a cab coupled to the chassis, the cab defining an interior compartment;

a drum assembly coupled to the chassis, the drum assembly including:

a mixing drum defining an aperture and an internal volume;

a charge hopper positioned proximate the aperture; and a chute positioned proximate the aperture, beneath the charge hopper;

a hopper actuator positioned to move the charge hopper between a first position and a second position, the first position facilitating loading materials into the internal volume of the mixing drum via the charge hopper through the aperture, the second position facilitating discharging the materials from the internal volume, through the aperture, and to the chute;

a first chute actuator positioned to pivot the chute about a lateral axis;

a second chute actuator positioned to pivot the chute about a vertical axis;

a drum driver positioned to drive the mixing drum; and a single joystick positioned within the interior compartment of the cab that provides a plurality of controls that facilitate selectively operating:

(i) the hopper actuator to reposition the charge hopper between the first position and the second position;

(ii) the first chute actuator to pivot the chute about the lateral axis to raise and lower a distal end of the chute;

(iii) the second chute actuator to pivot the chute about the vertical axis to move the distal end left and right;

(iv) the drum driver to control at least one of a speed or a rotational direction of the mixing drum; and (v) the transmission in one of the plurality of modes;

wherein the single joystick includes:

a base;

an elongated shaft extending from the base; and a control portion positioned at free end of the elongated shaft, the control portion having a grip portion for a hand of an operator and a button interface providing at least one of the plurality of controls;

wherein the base is selectively repositionable within a x-y plane in response to movement of the grip portion by the operator, wherein movement of the base in one of a x-direction or a y-direction selectively operates the first chute actuator, and wherein movement of the base in the other of the x-direction or the y-direction selectively operates the second chute actuator;

wherein the button interface includes a first charge hopper button and a second charge hopper button, wherein engagement of the first charge hopper button selectively operates the hopper actuator to reposition the charge hopper from the first position to the second position, and wherein engagement of the second charge hopper button selectively operates the hopper actuator to reposition the charge hopper from the second position to the first position; and wherein the button interface includes a first dial selectively repositionable in a first direction and an opposing second direction from a neutral position to selectively operate the drum driver, wherein the first dial is spring-biased to the neutral position, wherein movement of the first dial in the first direction facilitates at least one of (i) starting rotation of the mixing drum in a first rotational direction, (ii) increasing the speed of the mixing drum in the first rotational direction, (iii) slowing the speed of the mixing drum if rotating in an opposing second rotational direction, or (iv) flipping the rotational direction of the mixing drum from the opposing second rotational direction to the first rotational direction if rotating in the opposing second rotational direction, and wherein movement of the first dial in the opposing second direction facilitates at least one of (i) starting rotation of the mixing drum in the opposing second rotational direction, (ii) increasing the speed of the mixing drum in the opposing second rotational direction, (iii) slowing the speed of the mixing drum if rotating in the first rotational direction, or (iv) flipping the rotational direction of the mixing drum from the first rotational direction to the opposing second rotational direction if rotating in the first rotational direction.

2. The concrete mixer vehicle of claim 1, wherein the button interface includes a stop button, and wherein engagement of the stop button stops operation of the drum driver to stop rotation of the mixing drum.

3. The concrete mixer vehicle of claim 2, wherein the button interface includes a second dial selectively repositionable in a first direction and an opposing second direction from a neutral position to selectively reconfigure the transmission, and wherein the second dial selectively engages (i) a drive detent when repositioned in the first direction to facilitate reconfiguring the transmission into the drive mode, (ii) a neutral detent when in the neutral position to facilitate reconfiguring the transmission into the neutral mode, and (iii) a reverse detent when repositioned in the opposing second direction to facilitate reconfiguring the transmission into the reverse mode.

4. The concrete mixer vehicle of claim 3, wherein the chute includes a base chute and an extension chute pivotally coupled to the base chute, further comprising a third chute actuator positioned to pivot the extension chute relative to the base chute between a folded configuration and an unfolded configuration.

5. The concrete mixer vehicle of claim 4, wherein the plurality of controls facilitate selectively operating the third chute actuator to pivot the extension chute between the folded configuration and the unfolded configuration.

6. The concrete mixer vehicle of claim 5, wherein the button interface includes an extension chute button, and wherein engagement of the extension chute button selectively operates the third chute actuator.

7. The concrete mixer vehicle of claim 6, wherein the extension chute button includes an unfold button and a fold button, wherein engagement of the unfold button selectively operates the third chute actuator to pivot the extension chute from the folded configuration to the unfolded configuration, and wherein engagement of the fold button selectively operates the third chute actuator to pivot the extension chute from the unfolded configuration to the folded configuration.

8. A controller for a concrete mixer vehicle, the controller comprising:

a base;

an elongated shaft extending from the base; and a control portion positioned at free end of the elongated shaft, the control portion having a grip portion for a hand of an operator and a button interface providing at least one of a plurality of controls;

wherein the plurality of controls facilitate selectively operating:

(i) a hopper actuator to reposition a charge hopper of the concrete mixer vehicle between a first position and a second position;

(ii) a first chute actuator to pivot a chute of the concrete mixer vehicle about a lateral axis to raise and lower a distal end of the chute;

(iii) a second chute actuator to pivot the chute about a vertical axis to move the distal end left and right;

(iv) a drum driver to control at least one of a speed or a rotational direction of a mixing drum of the concrete mixer vehicle; and (v) a transmission of the concrete mixer vehicle in one of a plurality of modes; and wherein the button interface includes a dial selectively repositionable in a first direction and an opposing second direction from a neutral position to selectively reconfigure the transmission, and wherein the dial selectively engages (i) a drive detent when repositioned in the first direction to facilitate reconfiguring the transmission into a drive mode, (ii) a neutral detent when in the neutral position to facilitate reconfiguring the transmission into a neutral mode, and (iii) a reverse detent when repositioned in the opposing second direction to facilitate reconfiguring the transmission into a reverse mode.

9. The controller of claim 8, wherein the base is selectively repositionable within a x-y plane in response to movement of the grip portion by the operator, wherein movement of the base in one of a x-direction or a y-direction selectively operates the first chute actuator, and wherein movement of the base in the other of the x-direction or the y-direction selectively operates the second chute actuator.

10. The controller of claim 8, wherein the button interface includes a charge hopper button, and wherein engagement of the charge hopper button selectively operates the hopper actuator.

11. The controller of claim 8, wherein the plurality of controls facilitate selectively operating a third chute actuator to pivot an extension chute coupled to the chute between a folded configuration and an unfolded configuration, wherein the button interface includes an extension chute button, and wherein engagement of the extension chute button selectively operates the third chute actuator.

12. A controller for a concrete mixer vehicle, the controller comprising:

a base;

an elongated shaft extending from the base; and a control portion positioned at free end of the elongated shaft, the control portion having a grip portion for a hand of an operator and a button interface providing at least one of a plurality of controls;

wherein the plurality of controls facilitate selectively operating:

(i) a hopper actuator to reposition a charge hopper of the concrete mixer vehicle between a first position and a second position;

(ii) a first chute actuator to pivot a chute of the concrete mixer vehicle about a lateral axis to raise and lower a distal end of the chute;

(iii) a second chute actuator to pivot the chute about a vertical axis to move the distal end left and right;

(iv) a drum driver to control at least one of a speed or a rotational direction of a mixing drum of the concrete mixer vehicle; and (v) a transmission of the concrete mixer vehicle in one of a plurality of modes; and wherein the button interface includes a first dial selectively repositionable in a first direction and an opposing second direction from a neutral position to selectively operate the drum driver, wherein the first dial is spring-biased to the neutral position, wherein movement of the first dial in the first direction facilitates at least one of (i) starting rotation of the mixing drum in a first rotational direction, (ii) increasing the speed of the mixing drum in the first rotational direction, (iii) slowing the speed of the mixing drum if rotating in an opposing second rotational direction, or (iv) flipping the rotational direction of the mixing drum from the opposing second rotational direction to the first rotational direction if rotating in the opposing second rotational direction, and wherein movement of the first dial in the opposing second direction facilitates at least one of (i) starting rotation of the mixing drum in the opposing second rotational direction, (ii) increasing the speed of the mixing drum in the opposing second rotational direction, (iii) slowing the speed of the mixing drum if rotating in the first rotational direction, or (iv) flipping the rotational direction of the mixing drum from the first rotational direction to the opposing second rotational direction if rotating in the first rotational direction.

13. The controller of claim 12, wherein the button interface includes a stop button, and wherein engagement of the stop button stops operation of the drum driver to stop rotation of the mixing drum.

14. A concrete mixer vehicle comprising:

a chassis;

an engine coupled to the chassis;

a front axle coupled to the chassis;

a rear axle coupled to the chassis;

a transmission coupled to the engine and at least one of the front axle or the rear axle;

a cab coupled to the chassis, the cab defining an interior compartment;

a drum assembly coupled to the chassis, the drum assembly including:

a mixing drum defining an aperture and an internal volume;

a charge hopper positioned proximate the aperture;

a chute positioned proximate the aperture, beneath the charge hopper; and a chute extension pivotally coupled to a distal end of the chute;

a hopper actuator positioned to move the charge hopper between a first position and a second position;

a first chute actuator positioned to pivot the chute about a lateral axis;

a second chute actuator positioned to pivot the chute about a vertical axis;

a third chute actuator positioned to pivot the chute extension relative to the chute between a first configuration and a second configuration;

a drum driver positioned to drive the mixing drum; and a joystick positioned within the interior compartment of the cab, the joystick including:

a base;

an elongated shaft extending from the base; and a control portion positioned at free end of the elongated shaft, the control portion having a grip portion for a hand of an operator and a button interface, the button interface including (i) a charge hopper button that facilitates selectively operating the hopper actuator, (ii) an extension chute button that facilitates selectively operating the third chute actuator, (iii) a stop button that facilitates stopping operation of the drum driver to stop rotation of the mixing drum, (iv) a first dial selectively repositionable in a first direction and an opposing second direction from a neutral position to control at least one of a speed or a rotational direction of the mixing drum, and (v) a second dial repositionable in a first direction and an opposing second direction from a neutral position to selectively reconfigure the transmission between a drive mode, a neutral mode, and a reverse mode;

wherein the base is selectively repositionable within a x-y plane in response to movement of the grip portion by the operator;

wherein movement of the base in one of a x-direction or a y-direction selectively operates the first chute actuator; and wherein movement of the base in the other of the x-direction or the y-direction selectively operates the second chute actuator.

* * * * *